Patented May 10, 1932

1,858,150

UNITED STATES PATENT OFFICE

ADOLF GORHAN, OF LIESING, NEAR VIENNA, AUSTRIA, ASSIGNOR, BY MESNE ASSIGNMENTS, TO FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS FOR CONCENTRATING VOLATILE ALIPHATIC ACIDS

No Drawing. Application filed May 24, 1928, Serial No. 280,393, and in Germany June 2, 1927.

It has already been known for a long time to convert dilute acetic acid into concentrated form by introducing potassium acetate in considerable excess into the dilute solution whereby acid potassium acetate is precipitated and from which precipitate the acetic acid in concentrated form can then be obtained by decomposition. This process, to which are attached various disadvantages, has not yet been used commercially.

According to the present invention it is possible to concentrate dilute volatile aliphatic acids, particularly dilute acetic acid, with commercial and economical success by extracting the acid from acid-vapour mixtures by treatment with salts which are capable of forming with the acids to be concentrated, double salts which can be separated in solid form under given conditions.

The invention will be described, by way of example, as applied to the concentration of acetic acid. The dilute acetic acid is subjected to distillation and the vapours are brought into contact with potassium acetate. This may be effected with advantage for example on the counter-current principle, for example in such a manner that the vapours are introduced into the lower portion of a column into which is sprayed a strongly concentrated potassium acetate solution. The acetate solution withdraws the acetic acid from the vapour mixture, whereas the water vapour leaves the upper portion of the column.

From the acetate solution flowing out of the lower portion of the column the double salt which is formed is separated by cooling. The separating process may be promoted by agitating the material, for example by allowing this to flow into strongly cooled jigging troughs.

The separated salt is separated from the solution and if desired after preliminary treatment, for example by treatment with hot air, is decomposed. The decomposition process may be carried out with or without a vacuum; too high temperatures are to be avoided as for example at about 300° C. acetone is formed. In general temperatures of about 200° C. have been found very suitable. The acetic acid is thus obtained in a highly concentrated form, if desired as glacial acetic acid. The acetate remaining from the decomposition process may together with the acetate mother liquor, which latter if desired may again be brought to a suitable concentration, be again returned into the operation. Instead of treating the double salt formed, for example acid potassium acetate, so as to produce concentrated free acid by decomposition, it may also be used alone or treated in other ways, for example for the production of other salts, esters and the like.

Instead of the exceedingly suitable potassium acetate it is also possible to use other neutral salts which are capable of combining acids and separating the double salts formed. As such may be mentioned for example also other alkaline salts and alkaline earth salts. Salt mixtures may also be used.

The process is suitable for concentrating dilute acids for example acetic acid of different degrees of concentration, for example fermenting vinegar, waste acetic acids, as for example are waste from the manufacture of acetyl cellulose; it is also particularly suitable for the concentration of pyroligneous acid.

When treating this initial substance the tar remains in the distillation retort whereas the oily and empyreumatic substances and any formic acid which may be present pass off with the water vapor. There is then therefore immediately obtained very pure acetic acid. It will be understood that the raw pyroligneous acid may also be subjected to a preliminary treatment for removal of tar, if desired in the distillation retort.

Further experiments have shown that in many cases it is possible and of advantage not to separate the double salt firstly from the concentrated solution obtained, but to utilize the solution itself for directly obtaining the acid. This for example may be effected by heating the solution when, after separating a dilute first running, the concentrated acid distills off for example in the case of sodium acetate the acetic acid at about between 170 and 200° C. When using a vacuum the driving off of the acetic acid is completed at about 220° C. Such a method of operation is preferred for example when operating with the sodium salt of acetic acid or with mixtures which contain this salt. Amongst others the process has the advantage of a substantial simplification of the apparatus as the isolation of the double salt is omitted.

The abandonment of crystallization of the double salt does not lead, as might be anticipated, to a lower degree of purity of the resulting acid as it is possible, as for example the concentrated acetic acid only begins to pass over at about 170° C., for the impurities having a lower boiling point, to be collected and readily separated in the first runnings so that there is immediately obtained a very pure acid which has only to be separated, if desired, from substances having a higher boiling point by a second distillation in so far as these do not directly remain in the residue.

I claim:—

1. A process for converting dilute volatile aliphatic acids into concentrated form, consisting in bringing the dilute acid in the form of vapor in contact with a salt in solution, said salt being capable of forming with the acid a double salt.

2. A process for converting dilute volatile aliphatic acids into concentrated form, consisting in bringing the dilute acid in the form of vapor in contact with a concentrated solution of an alkali metal salt, said salt being capable of forming with the acid a double salt.

3. A process for converting dilute volatile aliphatic acids into concentrated form, consisting in bringing the dilute acid in the form of vapor in contact with a salt mixture in solution, said salt mixture being capable of forming with the acid double salts.

4. A process for converting dilute volatile aliphatic acids into concentrated form, consisting in bringing the dilute acid in the form of vapor in contact with a salt in solution, said salt being capable of forming with the acid a double salt, and decomposing the acid salt so as to convert it into concentrated acid.

5. A process for converting dilute volatile aliphatic acids into concentrated form, consisting in bringing the dilute acid in the form of vapor in contact with a salt in solution on the counter-current principle, said salt being capable of forming with the acid a double salt.

6. A process for converting dilute volatile aliphatic acids into concentrated form, consisting in passing the dilute acid in the form of vapour through a column and in withdrawing in said column the acid from the mixture of acid and water vapour by treatment with a concentrated solution of salts which are capable of forming with the acid double salts.

7. A process for converting dilute volatile aliphatic acids into concentrated form, consisting in bringing the dilute acid in the form of vapour in contact with a salt in solution which is capable of forming with the acid a double salt, and extracting the acid in concentrated form from the double salt which is formed by distillation without first separating off the accumulated aqueous solution.

8. A process for converting dilute acetic acid into concentrated form, consisting in evaporating acetic acid, and extracting the acid from the acid-water vapour mixture by treatment with potassium acetate in solution.

9. A process for converting dilute acetic acid into concentrated form, consisting in evaporating acetic acid, and extracting the acid from the acid-vapor mixture by treating said mixture with a salt mixture containing sodium acetate, said salt mixture being in solution and being capable of forming with the acid double salts.

10. A process for converting dilute acetic acid into concentrated form, consisting in evaporating the dilute acetic acid, extracting the acid from the acid-water vapor mixture by treatment with salts in solution which are capable of forming double salts, and decomposing said double salts by distillation without first separating off the accumulated aqueous solution.

In testimony whereof I affix my signature.

ADOLF GORHAN.